United States Patent [19]

Guenther et al.

[11] 4,398,459
[45] Aug. 16, 1983

[54] BAR CODE PRINTER WITH AUTOMATIC MECHANICAL PARITY

[75] Inventors: Kenneth L. Guenther, Park Ridge; Edward H. Zemke, Chicago, both of Ill.

[73] Assignee: Bell & Howell Company, Chicago, Ill.

[21] Appl. No.: 349,782

[22] Filed: Feb. 18, 1982

[51] Int. Cl.³ .............................................. B41T 9/12
[52] U.S. Cl. ................................. 101/93.01; 101/76; 101/93.09
[58] Field of Search .................. 101/72, 93.01, 76–79, 101/426; 235/92 EC; 371/53, 54, 71

[56] References Cited

U.S. PATENT DOCUMENTS

| | | | |
|---|---|---|---|
| 3,815,495 | 6/1974 | Strackbein | 101/76 |
| 4,085,670 | 4/1978 | Poole | 101/76 |
| 4,207,814 | 6/1980 | Schenk | 101/76 |
| 4,236,446 | 12/1980 | Lorrich et al. | 101/79 |
| 4,265,173 | 5/1981 | Takahashi et al. | 101/79 |
| 4,315,460 | 2/1982 | Sato | 101/93.09 |
| 4,329,572 | 5/1982 | Lorrich et al. | 371/53 X |

*Primary Examiner*—Edward M. Coven
*Attorney, Agent, or Firm*—Alan B. Samlan; Neal C. Johnson; Alan H. Haggard

[57] ABSTRACT

A bar code printing device with mechanical generation of a parity or check character. The mechanism is indexed by moving a plurality of push buttons or levers which when individually moved, engage a code belt which is connected to a parity generating mechanism. Each of the push buttons is associated with a single character of a sequence and can be moved in random order.

9 Claims, 5 Drawing Figures

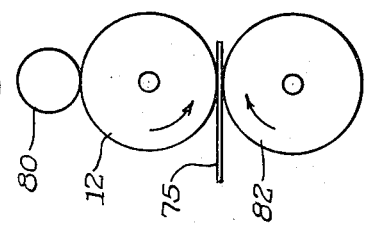
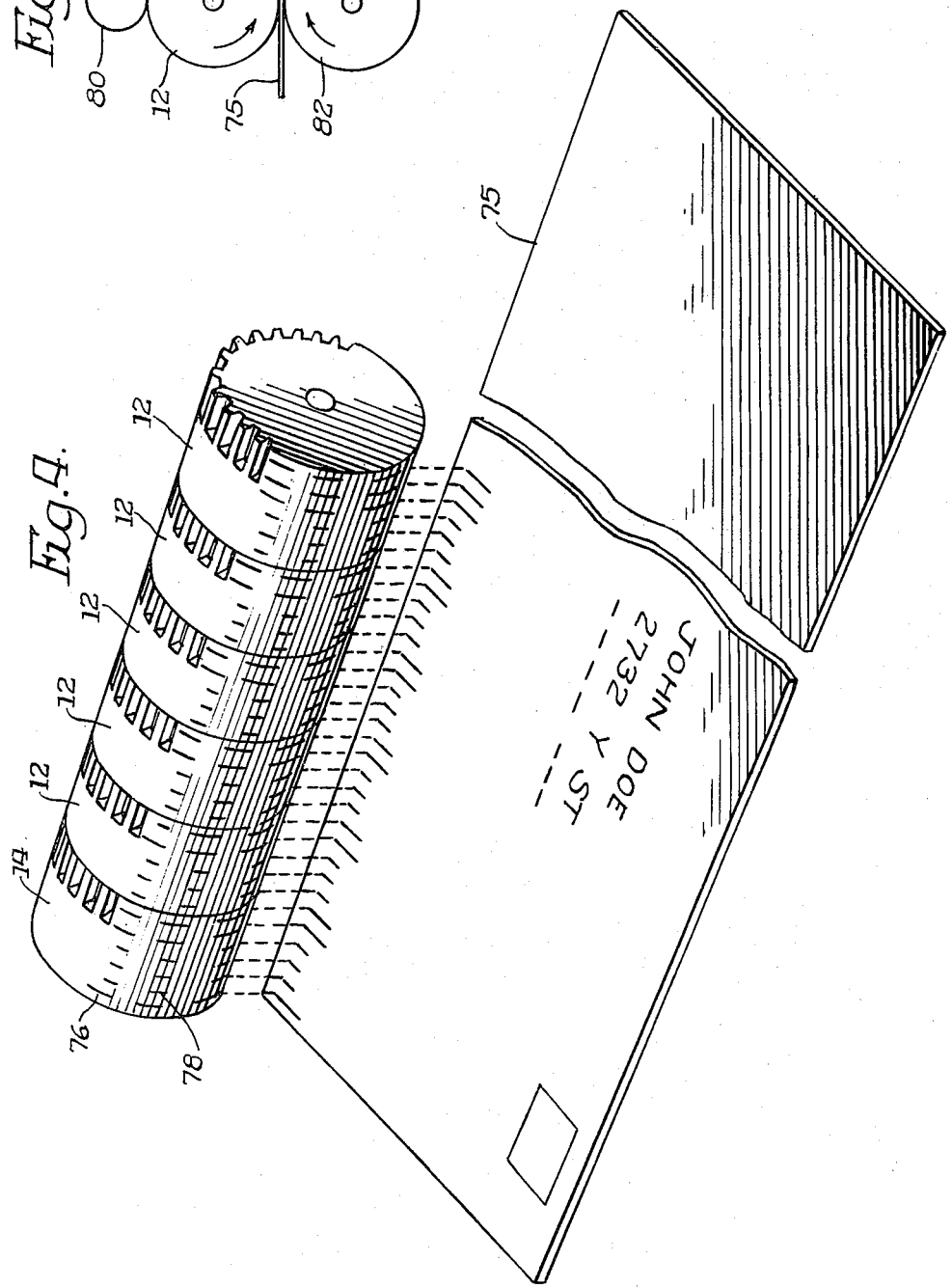

BAR CODE PRINTER WITH AUTOMATIC MECHANICAL PARITY

BACKGROUND OF THE INVENTION

This invention relates to a printing machine and is more particularly directed to a printing mechanism having a parity or check digit generated in accordance with a predetermined algorithm.

Recently, the U.S. Postal Service developed the Postal Numeric Encoding Technique (POSTNET) to provide an optimized bar code system for encoding ZIP CODE information on letter mail. This system was designed so the encoded information may be reliably read and decoded by state of the art optical reading systems.

In an ideal situation, an encoded bar code representing the full ZIP code and a parity character would be printed on all mail pieces by each business mailer. The large business mailers will have automated electronic equipment which will imprint the bar codes on the individual mail pieces. Normally, this equipment would be fully automated and would optically read the zip code from a mail piece, translating the zip code to an encoded bar code, and then imprint the encoded bar code on the mail piece. However, many small users would not have the required mail volume to purchase or lease this sophisticated equipment to imprint the POSTNET bar code. A less costly system is desired for those small business mailers having relatively few mail pieces. An inexpensive system would also be useful to large business mailers as automated systems might miss several pieces or be unable to read them. In these cases, the inexpensive manually operable system could individually print the bar code corresponding to the ZIP code of the unread mail piece.

The elements of the POSTNET bar code are bars and half bars representing binary 1's and 0's respectively. The code is a character by character representation of a five or nine digit zip code. Each time that a zip code is printed in bar code format, one additional character is encoded along with the zip code. This character, which is part of the error detection system, is called a parity bit or check digit.

The check digit in the POSTNET system is always selected so that the sum of all the digits in the bar code field is an integral multiple of ten. For example, the nine-digit zip code 12345-6789 is to be encoded in the POSTNET format. Summing the nine digits yields 45. A check digit of 5 will result in the sum of the 10 digits being an integral multiple of 10.

In the past, there have been numbering machines with means for generating a self-checking number or check digit. One example is found in U.S. Pat. No. 3,815,495 entitled "Modulus 10 Numbering Machine". This device uses various sensors and solenoids operated from a cam to increment and present the correct parity digit for printing. The system illustrated in U.S. Pat. No. 3,815,495 is extremely complex, requiring numerous sensors, cams, and mechanical and electrical connections in order to operate.

In U.S. Pat. No. 4,085,670 entitled "Check Digit Numbering Mechanism", a series of solenoids and movable armatures are also utilized. Again a complex electro-mechanical system is required for proper functioning.

It should be recognized that in both of these patents, the numbers which are printed on the documents are the numeric numbers which are desired. None of these devices contemplated or illustrated the use of printing bar code equivalents to the numbers or the check digit character generated.

SUMMARY OF THE INVENTION

Thus, it is an object of the present invention to provide an improved printing mechanism which is capable of printing bar codes corresponding to a desired number or series of numbers.

It is a further object of this invention to provide a bar code printing mechanism which will provide a check or parity digit which is also printed as a bar code adjacent to the bar code corresponding to the number.

It is a related object to provide a bar code printing mechanism which is inexpensive to build, simple in operation, and having a minimum number of parts.

Applicant has designed a bar code printing mechanism having a plurality of print wheels or bands, each of which contain the equivalent bar code for digits 0 through 9. The bar code format is in accordance with the U.S. Postal Service requirements. An operator positions movable levers to correspond to the desired zip code. This movement of the levers in turn position the print wheels such that the corresponding bar code is presented and can be printed on the mail pieces. The operator movable levers are also mechanically coupled to a check digit generator mechanism such that a check digit bar code wheel is moved to the correct position as the individual levers move the bar code printing wheels to the desired setting. Each bar code lever must be individually moved and is interlocked with the other levers to prevent more than one lever from being moved at any time. The sequence of bar code digits can be changed in any order and the check digit will always be correct.

DESCRIPTION OF THE DRAWINGS

A bar code printing mechanism with automatic mechanical parity will now be described by way of example with reference to the accompanying drawings wherein:

FIG. 4 is a perspective view of the print wheels as they would align with a mail piece to print the desired bar code at the corner of the mail piece; and FIG. 5 is an end view representing the printing of the bar code on a mail piece as it passes beneath the print wheels.

DETAILED DESCRIPTION OF THE PREFERRED EMBODIMENT

Figure 1:
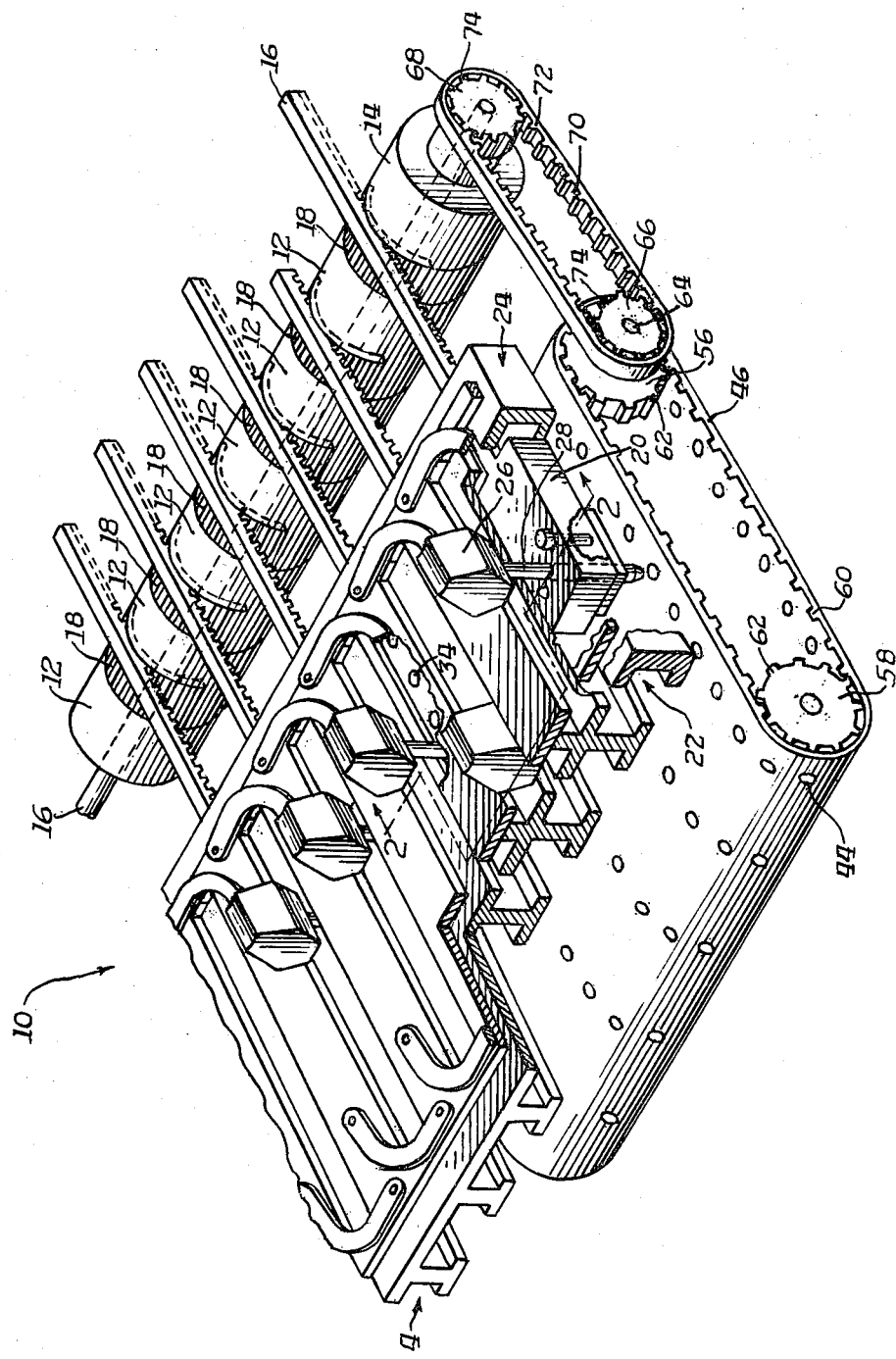
FIG. 1 is a perspective view of a portion of the bar code printing device with portions removed to illustrate the internal workings of the lever mechanism.

Turning first to FIG. 1, there is illustrated a printing mechanism 10 having a plurality of printing wheels 12 and a parity printing wheel 14 mounted along a centrally disposed common shaft 16. The number of printing wheels 12 can vary. Although five are illustrated in FIG. 1, it is desirable to have nine printing wheels to accommodate the nine digit zip code which the system is particularly suited for. The concept discussed herein, will work equally well for any reasonable number of bar codes desired to be printed.

The printing wheels 12 are driven by a positive engagement drive such as a gear rack 16 driving a pinion 18. Pinion 18 is fixedly attached to its respective printing wheel 12 so that as the pinion 18 rotates, the printing wheel 12 will simultaneously rotate a pre-determined amount.

The gear rack 16 is an integral part of slide 20 which rides in slot 22 formed within the frame 24. Each slide 20 has a hand-operated push button 26 having an elongated vertical shaft 28. Also, within each slide 20 is a spring-loaded detent pin 30 (FIG. 2) which accurately locates the push button 26 in any one of the desired positions along the slot 22. In the preferred embodiment there are ten positions along the slide to correspond to the digits zero through nine. Other combinations of alphanumeric characters could also be used. The pin 30 also provides a positive feedback to the operator while positioning the push button 26, so that he or she knows when the slide 20 is in its properly seated position adjacent the desired digit.

Figure 2:
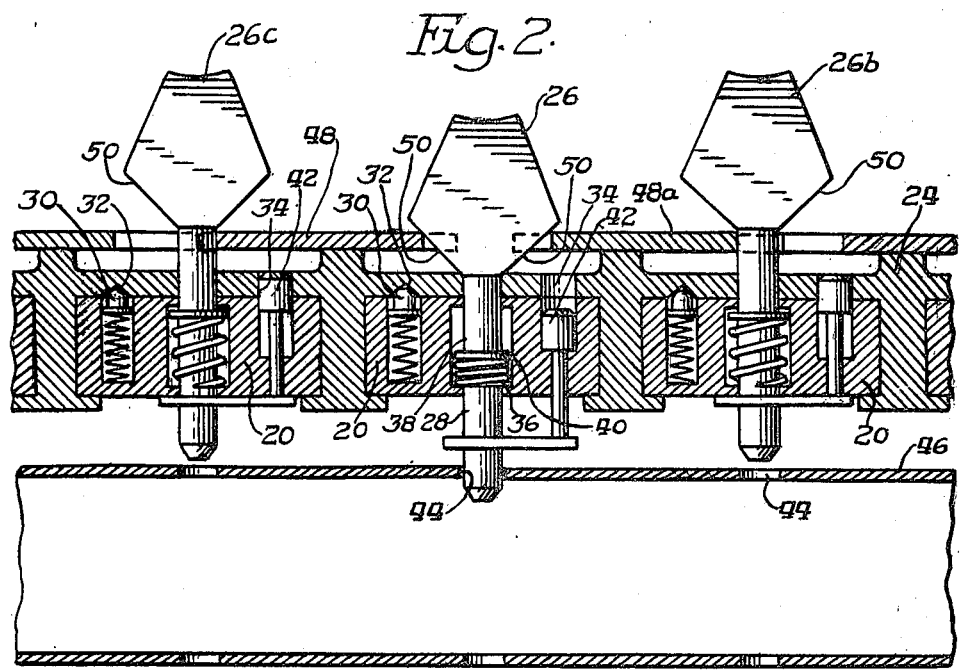
FIG. 2 is a cross-sectional view with portions removed taken along line 2—2 of FIG. 1.

It can also be seen in FIG. 2 that the top part of frame 25, which forms the top of the channel 22, has a series of locking holes 34 associated with each slide 20. These locking holes should be equal in number and correspond in their physical location to the detents. They are suitably positioned and spaced so that movement of the slide 20 from one detent position to the next detent position will increment or decrement the associated printing wheel 12 one position.

The amount of movement required will also depend on the gear ratio between rack 16 and pinion 18. To increment the push button 26, it must first be pushed down as seen by the center push button shown in FIG. 2. This forces the shaft 28 to be pushed down and overcomes the force of a spring 36 which is retained within a well 38 formed centrally within the slide 20. A collar 40 retains the spring 36 between itself and the bottom of the well 38. The downward movement of shaft 28 causes a locking pin 42 to be released from locking engagement with locking hole 34. The tip of the shaft 28 is pushed down into a hole 44 within a code belt 46. The code belt 46 has a continuous line of holes 44 associated with and inline with each push button shaft 28 with the holes 44 spaced apart the same distance as locking holes 34 and detents 32. Thus, when the push button 26 is moved forward or backward to increment or decrement its associated printing wheel 12, the code belt 46 is incremented or decremented an equal amount.

Figure 3:
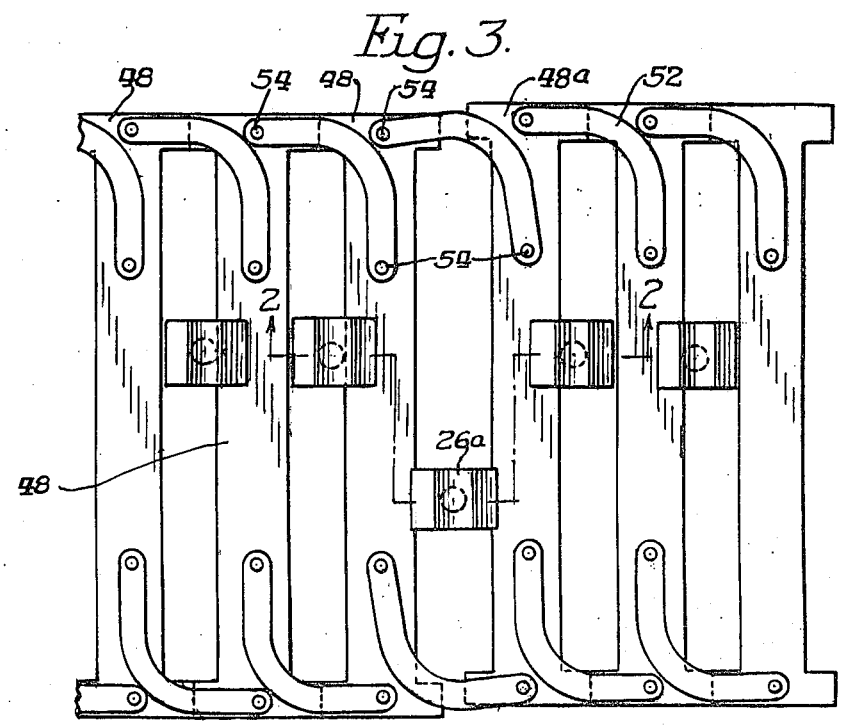
FIG. 3 is a top view with portions removed of the lever and interlock mechanism of FIG. 1.

The interlocking mechanism which provdes that only one of the push buttons 26 can be pressed down and moved at one time is most clearly seen in FIGS. 2 and 3. When the push button 26 is pushed down against the spring 36, ramped sides 50 of the push button 26 spread the interlock bars 48 apart from each other. This can be seen in FIG. 3 wherein push button 26a is pushed down and in the engaging code belt position. This causes interlock bar 48a to be pushed to the right and all interlock bars to the right of 48a to also be pushed to the right. It can be seen in FIG. 2 that with the interlock bar 48a pushed over to the side, push button 26b cannot be depressed as it will be stopped from going downward due to mechanical interlock of ramped side 50 with interlock bar 48a. Likewise, push button 26c could not be pushed down because it will engage interlock bar 48 on its right ramped side 50. Each of the interlock bars 48 are coupled to the adjacent bar by means of connecting links 52 which pivot around pivot points 54 to provide a parallelagram motion. Other interlocking mechanisms would be apparent to those skilled in the art. The important function of the interlock mechanism is to permit movement of only one push button 26 at one time.

The code belt 46 is stretched between two pulleys 56, 58. In the preferred embodiment the code belt 46 has teeth 60 which mate with teeth 62 on the pulleys 56, 58. Pulley 56 is fixedly attached to a shaft 64. A coupling pulley 66 is also fixedly attached to shaft 64. A second coupling pulley 68 is rotatably attached to shaft 16 and is aligned with coupling pulley 66. The coupling pulley 66 is positively coupled to coupling pulley 68 by means of a toothed belt 70 having teeth 72 which mate with complimentary teeth 74 on the pulleys 66 and 68. The ratio of the pulleys 56, 66 and 68 is chosen so as to advance the parity wheel 14 in accordance with the specific code algorithm desired.

In the preferred embodiment, a ratio of one to one was selected so that when code belt 46 is incremented or decremented one position, parity wheel 14 is incremented or decremented an equivalent amount. Furthermore, in this embodiment, the parity code wheel 14 has the bar coded digits placed around the wheel 14 in reverse order as compared to the printing wheel 14. Thus, if any one of the printing wheels 12 are incremented one digit or position, parity code wheel 14, although it is physically incremented one position is effectively decremented on digit.

If the coupling between code shaft 64 and parity wheel 14 were a reversing drive, such as a gear drive, the characters on the parity wheel would be placed around the wheel 14 in a forward order. Then if any one of the printing wheels 12 were incremented one or more digits, the parity code wheel 14, now physically decremented one position, is also effectively decremented one or more respective digits.

It is necessary that there be provided means to indicate the relative position of each of the push buttons 26. This could be accomplished by providing a thin plastic overlay (not illustrated) which would be supported above the frame 24 but would have the push buttons 26 extending up through it. Slots would be provided in the overlay so that the push buttons 26 could slide up and down freely. The desired alpha numeric codes could be imprinted along side the slot to give a visual indication of the position of the printing wheel as the push button 26 and its respective slide 20 is moved from detent position to detent position. In the POSTNET systems numbers zero through nine would be used. Other systems could have other character generating requirements.

Initially, the printing wheels are all set at zero and the parity wheel is also at zero. If any digit is incremented three positions, i.e., to 3, the parity code is decremented three positions, i.e., to 7, and the sum of the printing wheels and the parity wheels would equal 10. It can be readily seen that any digit can be incremented or decremented any amount and the parity wheel will be incremented or decremented the same amount and the parity check or correction character as required by POSTNET will be satisfied. It can also be seen that the print wheels can be incremented or decremented in any order without following a sequence and the parity wheel will be correct. The only criteria is that only one push button can be moved at a time.

The configuration of the printing bars on the printing and parity wheel 12 and 14 is clearly illustrated in FIG. 4. The mail piece 75 is positioned beneath the wheels such that the bar code will be imprinted on the mail piece at the desired location, preferably as illustrated on the lower right hand corner when viewing the envelope from the front normal reading position. Tall and short bars 76, 78 are raised on the wheels 12, 14 such that when inked and pressed onto the mail piece, they will imprint the mail piece with the code as set. Of course, any suitable method for inking the bar codes may be used.

In the present embodiment, the method of printing the bar code onto the mail piece 75 is represented in FIG. 5 wherein an ink transfer roller 80 inks the bars on printing wheel 12 as the wheel 12 is rotated. A backing roller 82 acts as support for the mail piece 75 during printing.

The U.S. Postal Service requirements require a tall bar, referred to as a field bar at both ends of the code imprinted. This can be achieved by the placement of two sets of tall bars. The first set of tall bars comprises a tall bar at the outer extremity of each bar code of parity wheel 14. The second set of tall bars compries a tall bar at the outer extremity of each bar code of the first bar location printing wheel 12. These field bars are illustrated in FIG. 4. Thus, a tall bar will be placed to the left of the first bar code of the first printing wheel 12 of FIG. 1 and to the right of the bar code on the parity wheel 14 when viewing the printing wheels and envelope from a frontal view in which the stamp is in the right hand corner.

Other mechanical mechanisms, such as gear trains of any one of a number of different types could be employed to connect the push buttons to the parity wheel. The type of system employed would depend on the parity character to be generated in response to the push button setting.

Thus it is apparent that there has been provided, in accordance with the invention, a bar code printing mechanism that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A printing device to print codes corresponding to characters comprising:
    a plurality of code printing wheels, each printing wheel having a series of codes and each code corresponding to a character;
    a plurality of operator movable selector means, each selector means connected to its respective code printing wheel and being capable of being positioned to correspond respectively with a character, each selector means serving as means for incrementing or decrementing its respective printing wheel in response to incrementing or decrementing the selector means;
    selector interlock means for preventing more than one of the selector means from being moved at any one time;
    parity character generation means comprising:
    a parity code printing wheel having a series of codes with each code corresponding to a parity character, the parity wheel mounted on a shaft,
    mechanical connecting means connected to and between the parity code printing wheel and the selector means,
    the movement of the selector means causing a corresponding directly proportional movement in the mechanical connecting means and in turn proportional rotational movement in the parity code printing wheel,
    whereby a single unit of movement in the selector means causes a corresponding single unit of rotational movement in the parity wheel.

2. The printing device of claim 1 wherein the mechanical connecting means comprises an endless belt which is engaged by and moved during movement of the selector means the endless belt connected to toothed power transmission means which drive the parity code printing wheel.

3. The printing device of claim 2 wherein the parity code printing wheel increments in response to a decrement of the selector means and decrements in response to an increment of the selector means.

4. The printing device of claim 2 wherein the toothed power transmission means comprises at least two gears connected by a toothed belt, one of the gears operatively connected to and driven by the endless belt and the other of the gears mounted on the shaft to rotate with the parity code printing wheel whereby the parity code printing wheel is rotated in response to the movement of the endless belt.

5. The printing device of claim 2 wherein the characters are digits and the codes on the printing wheels are bar codes having tall and short bars.

6. The printing device of claim 5 wherein the sum of the digits and the parity digit equals an integer multiple of ten.

7. The printing device of claim 6 further comprising a tall bar at the beginning and end of the bar code printed.

8. The printing device of claim 1 wherein the characters are digits and wherein the parity character generation means establishes a parity digit such that the sum of the digits and the parity digit is an integer multiple of ten.

9. A method of printing bar codes on a receiving medium, the codes corresponding to characters of a set comprising:
    positioning a plurality of operator movable selector means to correspond respectively with a character of the set,
    interlocking the selector means so that only one of the selector means can be moved at a time,
    providing a plurality of bar code printing wheels each having a series of bar codes thereon, with at least one bar code corresponding to its respective character,
    mechanically connecting each selector means to its respective bar code printing wheel,
    incrementing or decrementing the printing wheel in response to incrementing or decrementing the selector means,
    mechanically connecting the selector means to a parity code printing wheel,
    generating a parity character in response to positioning the selector means,
    mechanically rotating the parity code printing wheel in response to moving the selector means and generating the parity character so that the parity code printing wheel is positioned to print the proper parity character,
    whereby setting the selector means to correspond with the characters of the set automatically generates a bar code parity character and the bar code corresponding to the set and parity character can be imprinted on a receiving medium.

* * * * *